(12) United States Patent
Lewis

(10) Patent No.: US 8,573,144 B2
(45) Date of Patent: Nov. 5, 2013

(54) AGRICULTURAL EXHAUST CONDITIONING SYSTEM

(76) Inventor: Gary Lewis, Pincher Creek (CA)

( * ) Notice: Subject to any disclaimer, the term of this patent is extended or adjusted under 35 U.S.C. 154(b) by 323 days.

(21) Appl. No.: 12/999,754

(22) PCT Filed: Jun. 17, 2009

(86) PCT No.: PCT/CA2009/000815
§ 371 (c)(1),
(2), (4) Date: Feb. 15, 2011

(87) PCT Pub. No.: WO2010/003218
PCT Pub. Date: Jan. 14, 2010

(65) Prior Publication Data
US 2011/0139050 A1    Jun. 16, 2011

Related U.S. Application Data

(60) Provisional application No. 61/073,081, filed on Jun. 17, 2008.

(51) Int. Cl.
*A01C 14/00* (2006.01)
*A01C 15/04* (2006.01)
*A01B 77/00* (2006.01)
*A01G 11/00* (2006.01)

(52) U.S. Cl.
USPC ........ 111/174; 111/200; 701/50; 47/58.1 SC; 47/DIG. 10; 47/1.01 R; 47/1.42

(58) Field of Classification Search
USPC .............. 62/531, 902, 56, 132; 111/200, 900, 111/174, 175; 701/50, 1; 47/58.1 SC, 905, 47/DIG. 10, 1.01 R, 1.42
See application file for complete search history.

(56) References Cited

U.S. PATENT DOCUMENTS

2004/0159109 A1*    8/2004    Harvie ............................. 62/3.5

* cited by examiner

*Primary Examiner* — Christopher J Novosad
(74) *Attorney, Agent, or Firm* — Ryan W. Dupuis; Kyle R. Satterthwait; Ade & Company Inc.

(57) ABSTRACT

An exhaust conditioning system for use with a tractor towing an air seeding implement comprises an exhaust duct arranged to communicate exhaust emissions from the engine of the tractor to the seed fan of the air seeding implement. A condenser receives the exhaust emissions of the exhaust duct therethrough between the engine and the seed fan. A condenser fan cools a surface of the condenser. A computer controller controllably varies a rate of at least one of the condenser fan, the seed fan or revolutions per minute of the engine responsive to a sensed temperature of the exhaust emissions to maintain the temperature of the exhaust emissions within a selected temperature range and such that the exhaust emissions are arranged to influence germination of the seeds either by humidity, oxidised organic matter or biochar.

20 Claims, 3 Drawing Sheets

AGRICULTURAL EXHAUST CONDITIONING SYSTEM

Figure 1:
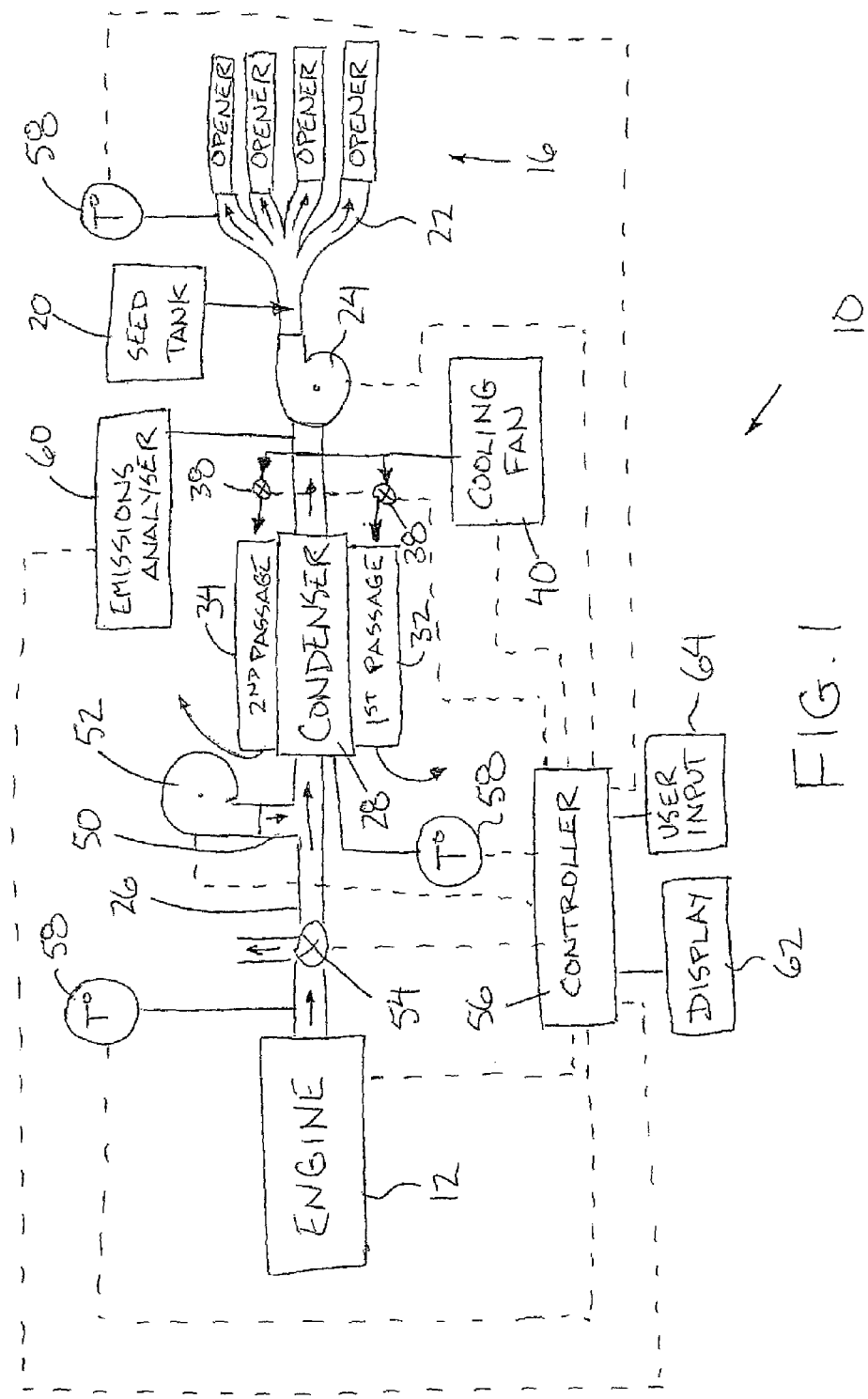

This application claims priority benefits from U.S. provisional application Ser. No. 61/073,081, filed Jun. 17, 2008.

FIELD OF THE INVENTION

The present invention relates to an exhaust conditioning system arranged for conditioning exhaust emissions from an internal combustion engine of agricultural equipment, and more particularly relates to an exhaust condition system for conditioning the exhaust to be suitably arranged for injection into the ground with seed in an agricultural seeding implement, or any implement that the conditioned exhaust would have a physiological influence on the carbon cycle of plants and or the mineral or chemical change of the soil when the conditioned emissions are used.

BACKGROUND

Agriculture is a large consumer of hydrocarbon fuels and fertilizers. Conversions range around 20 calories to produce 1 calorie of food. The use of industrial fixed fertilizers has and will increase yields at a high energy cost. Over use of fertilizers that are high in ammonium or are made with chloride salts causes changes plant uptake: more anions and fewer cations are taken up by the plant. Over long periods of time this can influence a number of key plant physiological processes such as photosynthesis, and change the pH of the root exudates. Plant root exudates feed much of the soil microorganisms and the chemical composition of the exudates determines the species diversity of the root-associated microbial community. Changes in the species diversity of the microbial community can affect plant health, soil nutrient cycling and mineral nutrient uptake by the plant. Analysis of microbial cells shows that over 95% of the cell dry weight is made up of carbon, nitrogen, oxygen, hydrogen, phosphorus, sulphur, calcium, potassium. magnesium and iron. These elements are required in milligram quantities for the microbial growth. Trace elements (zinc, copper, molybdenum, cobalt, manganese, and nickel are required in microgram amounts. These elements are used to synthesize proteins, carbohydrates, lipids, nucleic acids, as cofactors in enzyme complexes, and other key physiological processes. The exhaust from engines has many of these elements in the oxidized form that is required for microbial growth. In the standardized Soil Equivalent Medium for isolating soil microorganisms there are only millimolar concentrations (eg 2.5 mM ammonium, and 2.5 mM nitrite) used to isolate and grow million of soil bacteria and fungi. These can be supplied from exposing the soil to conditioned engine exhaust. It is likely that adding conditioned exhaust to the soil stimulates the growth of soil microorganisms by providing essential elements such as nitrogen, calcium, phosphorus, and iron in the oxidized form. Stimulating the growth of the soil microorganisms could increase the nutrient cycling, increase populations of plant growth promoting rhizobacteria, and generally improve the biological fertility of the soil, reducing the need for chemical fertilizer.

Micro-organisms use the oxidised compounds as building blocks to build proteins that become plant and microbial stimulants, enhanced interaction by the physiological shift by the influence of the conditioned emissions injection enhances the carbon cycle, and allowing the plant to store more sunlight energy and remove more CO2 from the atmosphere throughout the growing season.

This bioactivity is inhibited when large amounts of ammonium phosphate fertilizer are applied to the soil. Ammonium NH4 uptake by the roots causes the roots to use the HCO3 from photosynthesis changing the ammonia into urea before transporting nitrogen to the shoots. Excess hydrogen, leftover from ammonium and carbohydrates forming urea, is exchanged by the roots instead of HCO3 causing a lack of energy from the sun feeding bioactivity in the soil. Excess hydrogen protons makes the root zone acidic, causing problems with root growth and nutrient up take, less respiration of the soil causes compaction, and less mineralization and microbial life.

Canadian Patent Applications 2,611,168 and 2,509,172, both to Lewis, describe a system for injecting exhaust emissions from a tractor into the soil using an air seeding implement. If the temperature of the exhaust emissions are not suitably monitored and accurately controlled, excess exhaust heat may damage seed and the seed delivery tubes of the seeding implement, whereas insufficient exhaust temperatures results in too much condensation in the seed delivery tubes which causes seed blockage.

SUMMARY OF THE INVENTION

According to one aspect of the present invention there is provided an exhaust conditioning system for an internal combustion engine associated with an agricultural implement, the system comprising:

an exhaust duct arranged to communicate exhaust emissions from the engine to the agricultural equipment;

an impeller fan associated with the agricultural implement and arranged to draw a flow of exhaust emissions through the exhaust duct;

a condenser comprising an exhaust passage arranged to be coupled in series with the exhaust duct so as to receive the exhaust emissions therethrough between the engine and the impeller fan;

a condenser fan arranged to direct cooling air across a surface of the exhaust passage;

an exhaust temperature sensor arranged to sense a temperature of the exhaust;

a computer controller arranged to controllably vary a rate of at least one of the condenser fan, the impeller fan or revolutions per minute of the engine responsive to the temperature of the exhaust emissions to maintain the temperature of the exhaust emissions within a selected temperature range.

In some embodiments the agricultural implement comprises a mower having a mowing deck in which the engine is arranged for driving forward movement of the implement across the ground and the exhaust duct is arranged to communicate between the engine and the mowing deck such that the impeller fan is arranged to direct exhaust emissions into the mowing deck and such that the exhaust emissions are arranged to be mixed with grass clippings of the mowing deck and foliar for feeding the lawn.

In another embodiment, the agricultural implement comprises a roto-tiller having a tiller hood in which the engine is arranged for driving rotation of ground engaging blades of the roto-tiller for driving forward movement of the implement across the ground and the exhaust duct is arranged to communicate between the engine and the tiller hood such that the impeller fan is arranged to direct exhaust emissions into the hood and the exhaust emissions are arranged to be mixed into the ground.

In a preferred embodiment, the agricultural implement comprises an air seeding implement which comprises a plurality of openers arranged to form furrows in the ground, a seed tank, a plurality of seed tubes arranged to carry seed from the seed tank to the openers, and the engine comprises an engine of a tractor arranged for towing the air seeding implement. In this instance, the impeller fan preferably comprises a seed fan of the air seeding implement which is arranged to blow the seed through the seed tubes.

According to a second aspect of the invention there is provided an exhaust conditioning system for a tractor having an engine and being arranged for towing an air seeding implement comprising a plurality of openers arranged to form furrows in the ground, a seed tank, a plurality of seed tubes arranged to carry seed from the seed tank to the openers and a seed fan arranged to blow the seed through the seed tubes, the system comprising:

an exhaust duct arranged to communicate exhaust emissions from the engine of the tractor to the seed fan of the air seeding implement;

a condenser comprising an exhaust passage arranged to be coupled in series with the exhaust duct so as to receive the exhaust emissions therethrough between the engine and the seed fan;

a condenser fan arranged to direct cooling air across a surface of the exhaust passage;

an exhaust temperature sensor arranged to sense a temperature of the exhaust;

a computer controller arranged to controllably vary a rate of at least one of the condenser fan, the seed fan or revolutions per minute of the engine responsive to the temperature of the exhaust emissions to maintain the temperature of the exhaust emissions within a selected temperature range.

When conditioned emissions only are injected into the furrow instead of synthetic fertilizers, microorganism growth is increased promoting bacteria and fungi to colonize the seed-bed earlier.

As a net result of using a small amount of emissions to start up or prime the process of soil biological fertility this biological reaction that is powered by the sun's energy, agriculture can be practiced without using fossil fuel. Vegetable oils, bio-fuels and oil additives can cause a diesel engine to emit excessive amounts of NOX, aldehydes, hydrocarbons, and bio-chars emitted when the engine operates under pyrolosis conditions. These emissions are harmful to breath and release into the atmosphere causing smog but can be used in the soil as a carbon source increasing the bio-activity. Mixing ratios of fuel mixes are controlled by the emissions computer to maintain the desired carbon to nitrogen ratio.

Pressurising the seed tank with humid exhaust moistens the seed. Controlling the condensation will hydrate the seeds to enhance germination as seeds will sprout when they reach 45% moisture content. This is a seed priming effect that brings seeds out of dormancy. Black soot is double-bonded carbon that diesel engines emit when the fuel to air ratio is too high or the engine is under load and has a high cation exchange capacity that is beneficial in the soil. The condenser can become blocked with soot causing poor condenser performance. Controlling the fuel to air ratio type of fuel to cause the engine to develop the maximum amount of NOX and black soot maintains a 30 to 1 carbon to nitrogen ratio. This level of emissions is excessive to be released into the atmosphere but could be beneficial to the soil.

A computer controller which senses exhaust temperature and operates the condenser fan, the seed fan and the RPM of the engine provides accurate control of the exhaust temperature. This enables accurate control to both:

i) maintain temperature above a lower limit to prevent too much condensate and seed blockage, and ii) maintain temperature below an upper limit to prevent burning and damage to seed and seed tubes.

Preferably the system is arranged such that the exhaust emissions are arranged to influence germination of the seeds either by humidity, oxidised organic matter or bio-char.

The computer controller may be arranged to controllably vary the rate of each of the condenser fan, the seed fan, and a soil injection fan that lowers a pressure in the condenser and raises a pressure of an injection flow.

The computer controller may also controllably vary a ratio of biofuels and additives consumed by the engine to maintain a set carbon and nitrogen ratio of the emissions which is approximately 30 to 1.

There may provided an auxiliary exhaust temperature sensor arranged to sense a temperature of the exhaust adjacent each of the openers, the condenser and the engine. In this instance the computer controller may be responsive to the temperature of the exhaust emissions determined by each of the exhaust temperature sensors.

There may be provided a relief valve arranged to selectively redirect exhaust emissions from the engine away from the condenser responsive to the seed fan being inactive when the tractor is not in the field or when temperature of the exhaust exceeds a prescribed upper temperature limit.

When the computer controller is arranged to control a plurality of operating variables of the system responsive to respective selected set points, the set points may be arranged to be returned to respective default settings by the controller responsive to temperature of the exhaust exceeding a prescribed upper temperature limit.

There may be provided an auxiliary air intake in communication with the exhaust duct between the engine and the condenser which is arranged to inject ambient air into the exhaust duct to be mixed with the exhaust emissions prior to the seed fan.

There may also be provided an auxiliary fan arranged to direct air into the auxiliary air intake, the auxiliary fan being controlled by the computer controller.

The selected temperature range may comprise 90 to 200 degrees Fahrenheit and more preferably comprises 110 to 150 degrees Fahrenheit.

When the condenser is arranged to form condensate in the exhaust passage, preferably the exhaust passage is arranged to carry the condensate to the seed tubes.

The condenser preferably comprises: an exhaust passage arranged to be coupled in series with the exhaust duct so as to receive the exhaust emissions therethrough; a primary cooling passage arranged to direct cooling air across a first portion of the surface of the exhaust passage; and an auxiliary cooling passage arranged to direct cooling air across a second portion of the surface of the exhaust passage and wherein the computer controller is arranged to controllably vary an amount of cooling air received in the primary and auxiliary cooling passages respectively responsive to the temperature of the exhaust emissions.

The primary cooling passage may extend concentrically through the exhaust passage and the auxiliary cooling passage may be directed about an exterior of the exhaust passage.

There may be provided a plurality of exchanger tubes each arranged to communicate exhaust emissions diametrically across the primary cooling passage between two diametrically opposing sides of the exhaust passage.

There may be provided a baffle member in the exhaust passage associated with each exchanger tube in which the baffle member is arranged to redirected flow of exhaust emissions from an axial direction to a radial direction through the respective exchanger tube.

The primary cooling passage and the exhaust passage may comprise concentric tubular members joined at opposing ends by a press fit connection arranged to accommodate different thermal expansion rates of the tubular members in a longitudinal direction.

There may be provided an auxiliary compressed gas system arranged to periodically release charges of compressed gas at various locations in the condenser so as to be arranged to prevent exhaust soot from settling and blocking the condenser.

There may be provided an auxiliary water tank arranged to inject cooling water into the exhaust duct responsive to exhaust temperature exceeding a prescribed upper limit.

When there is provided an emissions analyzer arranged to determine contents of the exhaust emissions, the computer controller is preferably arranged to controllably vary the rate of at least one of the condenser fan, the seed fan or revolutions per minute of the engine responsive to the contents of the exhaust emissions. The computer controller may also be arranged to controllably vary a rate of bio-fuels having a high protein content consumed by the engine responsive to the contents of the exhaust emissions.

The amount of exhaust emissions may be arranged to be increased by the computer controller by increasing the RPM of the engine. The amount of exhaust emissions may also be arranged to be increased by the computer controller by increasing an operating temperature of the engine. The amount of exhaust emissions may be further arranged to be increased by the computer controller by reducing a rate of the seed fan or an injection fan that reduces the mixing of ambient air.

There may be provided an afterburner in series with the exhaust duct between the engine and the condenser. In this instance the amount of exhaust emissions may be arranged to be increased by the computer controller by combusting auxiliary fuel in the afterburner.

There may be provided a condensate measuring device arranged to measure an amount of condensate in the seed tubes. In this instance the computer controller may be arranged to controllably vary the rate of at least one of the condenser fan, the seed fan or revolutions per minute of the engine responsive to the amount of condensate.

The computer controller may be arranged to increase the amount of condensate by increasing the rate of the condenser fan or by increasing a surface area of the exhaust passage across which cooling air is directed.

The computer controller may also be arranged to decrease the amount of condensate responsive to blockage of the seed tubes with wet seed.

The computer controller is preferably arranged to display the exhaust temperature on an operator console.

When there is provided an emissions analyzer arranged to determine contents of the exhaust emissions and a fuel additive dispenser arranged to dispense fuel additives into the engine, the computer controller may be arranged to controllably vary a rate of dispensing of the fuel additives responsive to the contents of the exhaust emissions. The computer controller may also be arranged to controllably vary a rate of dispensing of the fuel additives responsive to a type of crop through which the tractor is driven. The fuel additives may comprise silicone for a grass crop or calcium for a legume crop.

The computer controller may be arranged to controllably vary a ratio of fuel and air consumed by the engine so as to be arranged to form biochar in the exhaust emissions.

The computer controller may also be arranged to increase a ratio of fuel to air consumed by the engine responsive to: i) an oxygen sensor indicating oxygen in the exhaust emissions exceeding a prescribed amount; or ii) content of the exhaust emissions sensed by an emissions analyser.

The computer controller may further be arranged to increase a ratio of fuel to air consumed by the engine until a particulate sensor in communication with the exhaust emissions detects a level of biochar in the exhaust emissions which equals a prescribed biochar level.

According to a second aspect of the present invention there is provided an exhaust conditioning system for an internal combustion engine, the system comprising:

an exhaust duct arranged to receive exhaust emissions from the engine of the agricultural equipment;

a condenser comprising:

an exhaust passage arranged to be coupled in series with the exhaust duct so as to receive the exhaust emissions therethrough;

a primary cooling passage arranged to direct cooling air across a first portion of the surface of the exhaust passage; and an auxiliary cooling passage arranged to direct cooling air across a second portion of the surface of the exhaust passage;

a condenser fan arranged to blow the cooling air through the respective cooling passages;

a computer controller arranged to controllably vary an amount of cooling air received in the primary and auxiliary cooling passages respectively responsive to a temperature of the exhaust emissions to maintain the temperature of the exhaust emissions within a selected temperature range.

Some embodiments of the invention will now be described in conjunction with the accompanying drawings in which:

BRIEF DESCRIPTION OF THE DRAWINGS

FIG. 1 is a schematic representation of the exhaust conditioning system according to a first embodiment.

FIG. 2 and FIG. 3 are schematic representations of the condenser mounting relative to the tractor, cultivator, or seed tank.

FIG. 4 is a perspective schematic illustration of the condenser.

FIG. 5 is a sectional view of one of the heat exchanger tubes in the condenser.

FIG. 6 is a schematic representation of the exhaust conditioning system according to a second embodiment.

FIG. 7 is a schematic representation of the exhaust conditioning system according to a third embodiment.

In the drawings like characters of reference indicate corresponding parts in the different figures.

DETAILED DESCRIPTION

Referring to the accompanying figures there is illustrated a preferred embodiment of an exhaust conditioning system generally indicated by reference numeral 10. The system 10 is particularly suited for use with an internal combustion engine 12, for example of the type used on a tractor 14 for towing an agricultural implement, such as an air seeding implement 16 as shown in the illustrated embodiment.

The air seeding implement 16 typically comprises a frame supported for movement across the ground in a forward working direction of the tractor. A plurality of openers are provided in the frame for forming respective furrows in the ground. A seed tank containing seed therein is associated with the frame of the implement, either being supported on the frame or being towed separately in the form of a seed cart so that a portion of the exhaust mixes with the seed and the emissions that are condensed and humid prime the seeds to start germination. A plurality of seed tubes 22 communicate between the seed tank 20 and each one of the openers 18 for conveying seed from the tank to each of the openers. An impeller fan 24 in the form of a seed fan or a blower is mounted in communication with the seed tubes for blowing seed from the tank through the tubes to the respective openers for injection into the furrows formed in the ground.

The system 10 generally comprises an exhaust duct 26 which communicates from the exhaust outlet of the engine 12 on the tractor to the inlet side of the seed fan 24 of the seeding implement to communicate the exhaust emissions of the engine to the seed fan for distribution through the seed tubes with the seed.

Figure 2:
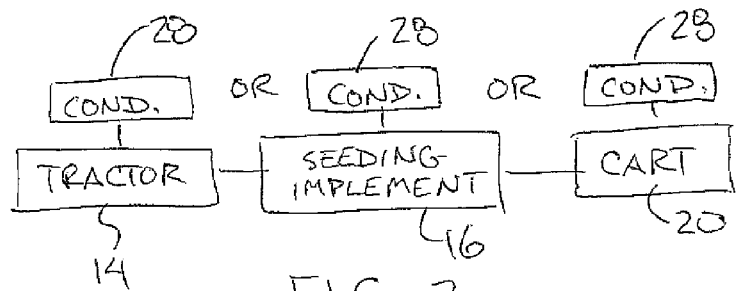
Figure 3:
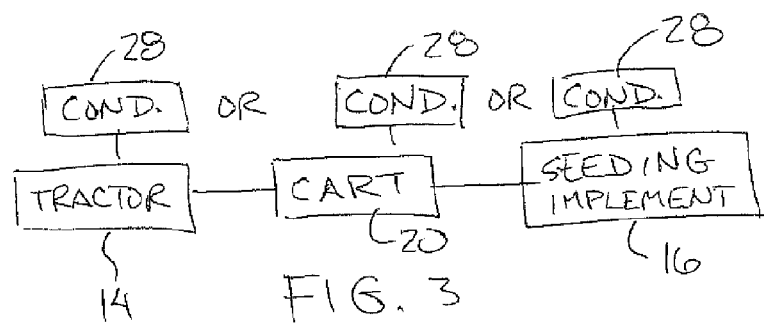
Figure 4:
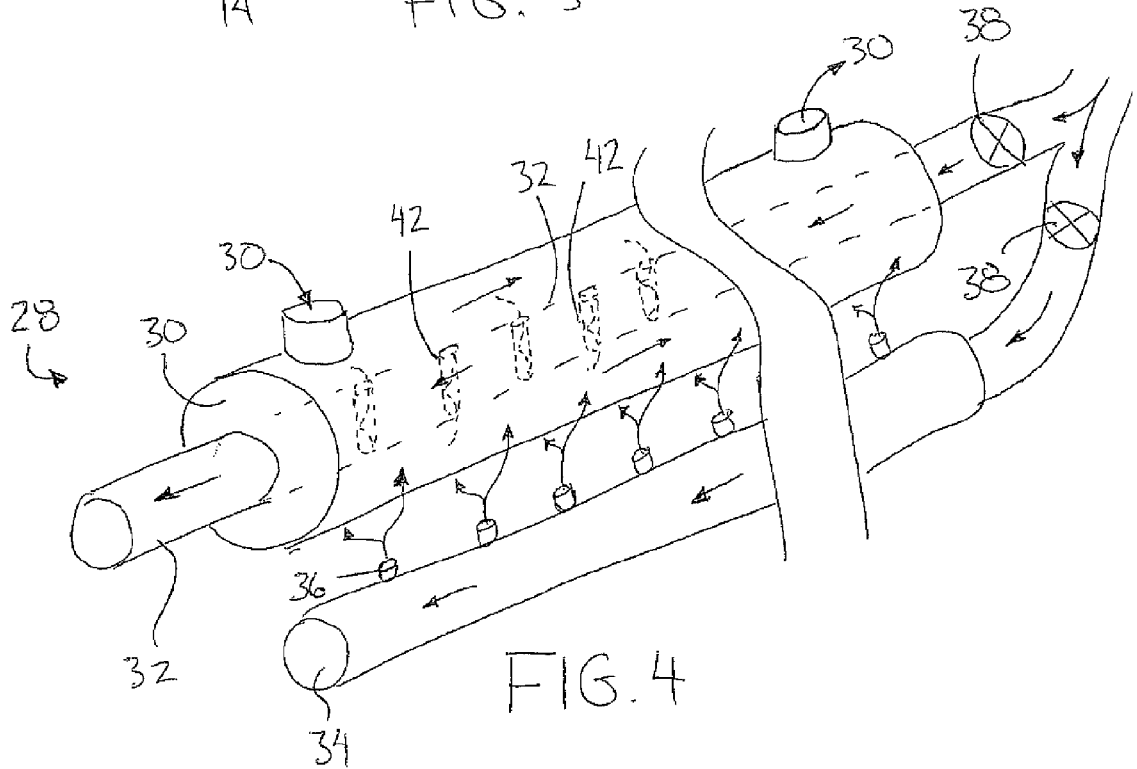
Figure 5:
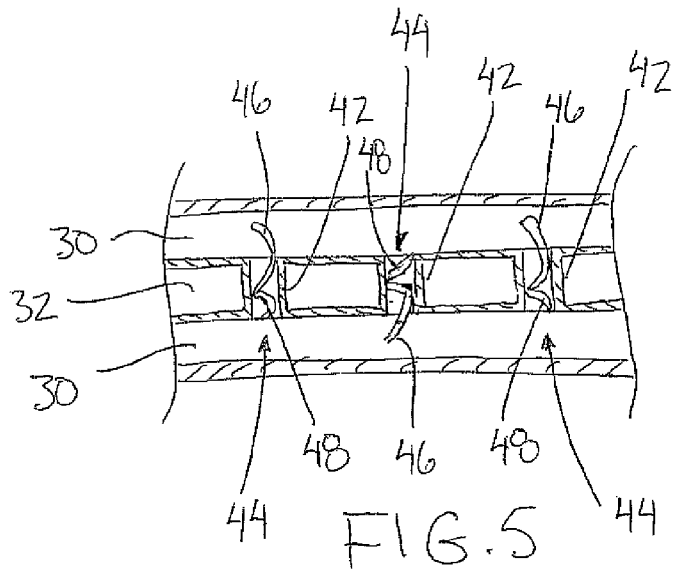

The system further comprises a condenser 28 which is connected in series with the exhaust duct 26 between the engine and the impeller or seed fan. The condenser 28 may be mounted either on the body of the tractor, on the frame of the seeding implement, or on a separate towed seed cart regardless of the placement of the cart relative to the seeding implement as shown schematically in FIGS. 2 and 3.

More particularly the condenser 28 comprises an exhaust passage 30 which is a tubular member which is elongate in a longitudinal direction for receiving exhaust in the longitudinal direction therethrough. A primary cooling passage 32 comprises a tubular member which is smaller in diameter than the exhaust passage 30 and is positioned to extend concentrically through the center of the exhaust passage in the longitudinal direction thereof.

The exterior wall of the primary cooling passage 32 forms an inner boundary surface of the exhaust passage 30 such that the exhaust passage comprises a generally annular space between the wall of the cooling passage forming a first portion of the exhaust passage surface and a surrounding exterior wall of the exhaust passage 30 having an external surface which comprises a second portion of the exhaust passage surface and which is exposed to the surrounding atmosphere.

A second cooling passage 34 is provided in the form of a separate tube extending in the longitudinal direction parallel to and spaced from the exterior wall of the exhaust passage 30. The secondary cooling passage 34 comprises a manifold communicating cooling air therethrough to a plurality of nozzles spaced in the longitudinal direction from one another along one side of the tube forming the second cooling passage. The nozzles are directed in a radial direction towards the outer surface of the exhaust passage 30.

Accordingly cooling air directed through the primary cooling passage passes over the first inner portion of the surface of the exhaust passage while cooling air directed through the second cooling passage 34 is directed by the spaced apart nozzles 36 thereof to be blown across a second exterior surface portion of the exhaust passage 30.

Each of the primary and secondary cooling passages includes a respective damper 38 in communication therewith to open and close access of cooling air to the respective cooling passage. A cooling or condenser fan 40 is provided for drawing air from the surrounding environment to be blown through both the primary and secondary cooling passages when the respective dampers 38 are open.

The dampers can be operated in four different modes to accurately control the cooling rate of the exhaust as it passes through the condenser using only a single cooling fan 40. For maximum cooling, both dampers remain open so that cooling air is directed both axially through the central primary cooling passage and about the exterior of the exhaust passage 30 by the nozzles of the second cooling passage 34.

To partly reduce cooling, the damper to the second cooling passage can be closed so that cooling air is only blown by the cooling fan through the primary cooling passage while the exterior surface of the exhaust passage 30 is still permitted some cooling from the surrounding ambient air in contact therewith.

To further reduce the amount of cooling provided at the condenser, the damper 38 to the primary cooling passage 32 may be closed and the damper to the second cooling passage 34 may instead be opened so that the only cooling occurs between the exterior of the exhaust passage 30 and the surrounding ambient air assisted by a flow of air from the nozzles of the second cooling passage 34 directing the flow thereof across the exterior surface.

To minimize the amount of cooling provided by the condenser, both dampers are closed and the operation of the cooling fan 40 is discontinued so that the only cooling provided is by ambient air in communication with the exterior surface of the exhaust passage.

To optimize the heat transfer across the boundary wall between the primary cooling passage 32 and the exhaust passage 30 of the condenser, a plurality of heat exchanger tubes 42 are provided which extend diametrically across the first passage 32 to communicate exhaust emissions between two diametrically opposed sides of the exhaust passage with the exchanger tubes 42 remaining sealed with respect to the primary cooling passage 32 so that none of the cooling air in the primary cooling passage extends into the exhaust passage and vice versa, but the boundary surface area between the exhaust passage 30 and the primary cooling passage 32 is increased considerably.

To encourage airflow through the exchanger tubes 42, baffles 44 are preferably supported within the exchanger tubes 42 respectively. Each baffle 44 includes a scoop portion 46 extending out of the respective exchanger tube to partly span across the annular gap forming the exhaust passage, and a twisting portion 48 in the form of a generally helical screw extending in an axial direction through the respective exchanger tube. The baffles thus function so that exhaust flowing in the longitudinal direction through the exhaust passage 30 contacts the scoop portion 46 directed into the oncoming flow of exhaust so that the scoop portion redirects the exhaust in a diametrical direction through the respective exchanger tube 42 associated therewith. As the exhaust is directed through the exchanger tube, the twist portion 48 encourages a turbulent air flow to maximize the contact of the exhaust with the boundary surface between the exhaust passage 30 and the primary cooling passage 32. In the longitudinal direction, the scoop portion 46 of each baffle 44 extends from one end of the respective exchanger tube 42 which is diametrically opposite to the scoop portion of the next adjacent ones of the baffles in the respective exchanger tubes 42. The scoop portions 46 are thus configured in an alternating configuration along the length of the condenser.

The condenser comprises a generally elongate structure, for example in some embodiments in the order of ten to fifteen feet in length while the primary cooling passage 32 may be in the order of eight inches in diameter in some embodiments with the outer boundary of the exhaust passage 30 possibly being in the order of ten inches in diameter. At opposing ends of the condenser, the outer boundary wall defining the exhaust passage 30 is reduced in diameter to join the outer wall of the primary cooling passage at a press-fit connection so as to permit some minor displacement in the axial direction of the outer wall of the primary cooling passage 32 relative to the outer wall of the exhaust passage 30 to accommodate for different rates of thermal expansion in the longitudinal direction.

The system 10 includes an auxiliary air intake 50 in communication with the exhaust duct 26 between the engine and the condenser to permit additional air to be drawn into the inlet of the exhaust passage where the demand from the seed fan exceeds the volume of exhaust coming from the engine. The seed fan maintains the exhaust passage through the condenser at a negative pressure drawn to the inlet side of the seed fan. The intake 50 may comprise a check valve which opens responsive to negative pressure in the exhaust duct, or more preferably an auxiliary fan 52 may be provided in communication with the intake to blow additional air into the inlet of the exhaust passage 30 in the condenser. The auxiliary air blown in by auxiliary fan 52 provides some additional cooling to the exhaust gases and the auxiliary air mixes directly with the exhaust emissions in the exhaust passage 30.

In instances where more exhaust is generated by the engine of the tractor than is required by the seed fan blower, a diverter relief valve 54 is coupled in series with the exhaust duct between the engine and the condenser to function as a pressure relief so that if there is excess back pressure on the engine of the tractor, the diverter valve 54 will open to divert excess exhaust to atmosphere through the existing exhaust stack of the tractor. The diverter valve 54 may serve to divert only a portion or all of the exhaust to the exhaust stack of the tractor. In a preferred embodiment, the diverter valve 54 remains in an open position to fully divert all of the exhaust to the stack of the tractor until the system 10 is confirmed to be in good operation at which point a computer controller 56 will close the valve and divert the exhaust through the condenser to the seed fan for distribution with the seed through the seed tubes into the ground.

The system 10 includes a plurality of temperature sensors 58 located at various points in communication with the exhaust emissions between the engine and the openers of the seeding implement. Sensors 58 are positioned: in communication with the exhaust adjacent the engine of the tractor, in communication with exhaust passing through the condenser, and in communication with exhaust passing through the seed tubes adjacent the openers. In this manner the computer control 56 can monitor the temperature of the exhaust throughout the entire system 10 to ensure that each of the components is operated at optimal conditions for generating favourable emission from the engine and for controlling an appropriate amount of condensation in the exhaust prior to passage through the seed tubes and into the ground.

The exhaust duct, the exhaust passage in the condenser and the communication of the exhaust with the seed fan and seed tubes is arranged so that condensation formed in the condenser remains in the exhaust passage and is carried with the exhaust to the seed tubes and openers for injection into the ground together with the seed. Accordingly an optimal temperature is required at the seed tubes so that the exhaust remains hot enough to prevent too much condensation which may plug seed within the seed tubes, while providing sufficient cooling that the seed is not cooked by the hot exhaust and that the seed tubes are not damaged by excess heat.

In addition to temperature sensors, an emissions analyser 60 is coupled in communication with the exhaust duct at the outlet of the condenser or at the seed tubes to analyse the components and determine the contents of the emissions. Accordingly the ratio of auxiliary cooling air to exhaust emissions can be determined as wall as the ratios and levels of carbon dioxide, and various NOX compounds. The computer controller 56 receives all of the emissions information from the analyser 60 as well as the temperature information from the various sensors 58 for displaying all this information on a suitable display 62 in the operator cab of the tractor as well using the information to operate the system 10 in the most favourable manner.

As described herein, the exhaust duct is generally arranged to redirect the exhaust emissions which have been conditioned by the computer controller such that the exhaust emissions are arranged to influence germination of the seeds either by humidity, oxidised organic matter or bio-char. The formation of biochar involves forming charcoal in the exhaust emissions by the pyrolysis of biomass in the fuel consumed by the internal combustion engine. The computer controller controllably varies a ratio of fuel (including biofuel or other biomass related fuel additives) and air consumed by the engine to cause formation of a desired amount of biochar in the exhaust emissions. An oxygen sensor in communication with the computer controller indicates the amount of oxygen in the exhaust emissions to increase the ratio of biomass derivatives in the fuel to air consumed by the engine responsive to the oxygen sensor indicating oxygen exceeding a prescribed amount. The computer controller is also arranged to increase a ratio of fuel to air consumed by the engine responsive to contents of various indicative compounds in the exhaust emissions as sensed by the emissions analyser 60. Furthermore, the computer controller can be arranged to increase a ratio of fuel to air consumed by the engine until a particulate sensor of the computer controller in communication with the exhaust emissions detects a level of biochar in the exhaust emissions which equals a prescribed biochar level.

The display 62 includes a user input 64 which permits an operator to enter various characteristics relating to the upper and lower temperature limits for the particular tractor and seeding implement being used, as well as desired condensate levels and emissions levels in the exhaust stream dependent upon the soil conditions.

The computer controller 56 operates the revolutions per minute of the engine, the seed fan, the cooling fan, and the auxiliary air fan 52, as well as the various dampers and valves in an appropriate fashion to maintain the exhaust temperature within an optimal selected range between an upper selected temperature limit and a lower selected temperature limit for each zone of the system including the exhaust duct adjacent the engine, at the condenser, and at the seed tubes of the seeding implement.

Too much condensate which can contribute to seed plugging is avoided or prevented by maintaining a temperature at the seed tubes above the selected lower limit. This is accomplished by first reducing the amount of cooling occurring at the condenser by suitably controlling the dampers of the first and second cooling passages and the rate of the cooling fan. Typically the temperature is controlled as close as possible to the upper temperature limit while preventing temperature which is beyond the upper limit which might cause damage to the seed or the seed tubes. Also to increase the temperature, the engine can be operated at a higher rate of RPM's, or the seed fan can be operated at a slower rate to prevent too much auxiliary air entering the intake 50. In some embodiments, depending upon the configuration of the equipment an exhaust temperature near 110° F. is desirable, whereas in other configurations an exhaust temperature near 150° F. is preferred. In general temperatures in the range of 90° F. to 200° F. are typically effective at permitting some condensate to form to be injected into the ground with the seed while also preventing damage to the seed or the seed tubes.

The computer may also monitor the moisture or condensate level in the seed tubes. If more condensate is desired due to very dry ground, auxiliary water can be added to the exhaust to perform some of the cooling function required instead of the use of a cooling fan. Alternatively the exhaust may be cooled to a greater degree so that additional condensate forms in the exhaust passages to be carried to the seed tubes for injection with the seed. It is desirable to adjust the rate of the seed fan, the cooling fan and RPM's of the engine to achieve a desired condensate level in the exhaust stream, but only while staying within the selected temperature range. To increase cooling for example the cooling fan may be operated at a higher rate or a greater amount of surface area of the exhaust passage through the condenser can be exposed to cooling air by controlling the dampers on both first and second cooling passage to be opened.

The controller can also operate the cooling fan, the seed fan and the engine RPM to maintain a desired emissions level while staying within the selected temperature range. To increase emissions, the engine can be operated at a higher rate of RPM's so that more volume of exhaust is produced instead of additional air being drawn in through the intake 50. Also the engine may be run at hotter temperatures to produce more desirable emissions per unit volume of exhaust.

Optionally, an afterburner can be connected in series with the exhaust adjacent the engine where more fuel can be added to produce more desirable emissions prior to passage through the condenser and injection into the ground by the seed fan.

Lowering the speed of the seed fan will also cause less auxiliary air to be drawn into the system through the intake 50 so that a higher ratio of the air passing through the condenser and the seed tubes comprises emissions.

To further control desirable emissions to be injected into the ground, a plurality of fuel additives may be added to the fuel on demand when the computer decides that the additives are required to alter the emissions ratios determined by the analyser 60. The additives used would vary depending on the desired emissions to interact to the crop and a type of soil. For example a silicone additive would be used on grass type crops, and a calcium additive would be used on legume type crops. Bio fuels of various origins have different minerals and protein content of the oil that change the emissions. To maintain a set carbon to nitrogen ratio the computer would mix high protein fuel with other oils or fuel with the highest protein oil that produces the highest NOX Brassicaceae family *Camelina Sativa.*

As described herein, the exhaust duct is arranged to redirect the exhaust emissions such that the exhaust emissions are arranged to influence germination of the seeds either by humidity, oxidised organic matter or bio-char. In addition to various other functions, of particular benefit is that the computer controller is arranged to controllably vary a soil injection fan that lowers a pressure in the condenser and raises a pressure of an injection flow. The computer controller can also controllably vary a ratio of biofuels and additives consumed by the engine to maintain a set carbon and nitrogen ratio of the emissions which is approximately 30:1.

When a relief valve is provided, it can be arranged to selectively redirect exhaust emissions from the engine away from the condenser responsive to the seed fan being inactive in addition to other causes noted above. The relief valve can also be arranged to selectively redirect exhaust emissions from the engine away from the condenser responsive to temperature of the exhaust exceeding a prescribed upper temperature limit.

When the computer controller controls a plurality of operating variables of the system responsive to respective selected set points, the set points are typically arranged to be returned to respective default factory settings responsive to temperature of the exhaust exceeding a prescribed upper temperature limit or any type of malfunction or undesirable or damaging condition detected by the computer.

An additional feature on the condenser is an auxiliary compressed gas system that is arranged to periodically release charges of compressed gas at various locations in the condenser. This can be done in response to a sensed condition to prevent exhaust soot from settling and blocking the condenser.

To further enhance the system described above, the emissions analyzer that determines contents of the exhaust emissions can also function with the computer controller so that the computer controller is arranged to controllably vary a rate of bio-fuels having a high protein content consumed by the engine responsive to the contents of the exhaust emissions.

The amount of exhaust emissions can also be increased by the computer controller by reducing a rate of the seed fan or an injection fan that reduces the mixing of ambient air.

The computer controller can select the type of fuel additives to be added in addition to controllably varying a rate of dispensing of the fuel additives responsive to a type of crop through which the tractor is driven. For example, for a grass crop the fuel additives comprise silicone, however for a legume crop, the fuel additives comprise calcium.

As described herein a computer controls the end temperature and desired emissions levels and moisture is made possible as the computer can sense the temperature and emissions levels. The system addresses over cooling on a cold day. As condensation builds when the emissions reach the dew point, the computer shuts down the condenser fan that is blowing outside air through a center tube. Cross tubes have a turbulent flow design which allows the hot exhaust to circulate through the tubes that conduct the heat to the cold air blown through the center tube. The exhaust can also conduct to the outer tube. On hot days extra air can be circulated around the outside tube with the same blower that delivers the inside air. Cross flow design includes an aluminum strip baffle that is twisted and which alternates direction along the length that it extends into the space between the inner and outer tube. As the hot exhaust passes through the tube, the twister strips catch the gas flow, swirling the gases through the cross tube. With alternating extensions into the gas flow, the gas circulates through the center tubes.

The design of the condenser is to maximise turbulence, maintain low back pressure on the engine and allow the black soot or bio-char when burning vegetable oils, used oil or changing the engines air fuel ratio mechanically or by computer settings. The condenser design allows soot to move through and not settle out as the emissions flow will carry the soot and bury it in the seed bed as this bio-char has a high cat-ion exchange capacity. A compressor that releases charges of compressed gasses would keep char from plugging the condenser. This gas could be ozone or compressed emissions or fresh air.

Expansion and contraction of hot and cold areas in the condenser has been addressed by allowing the center tube to contract without crushing the outer tube by press fit ends which allow the inner tube to contract without crushing the outer skin.

A console in the tractor cab displays the temperature zones of the emissions injection system. Onboard emissions analyzers can display the on going emissions levels injected into the soil. The computer can change the mixing ratio fuel types or desired moisture. A safety relief valve opens if the system fails and is normally open and closes only when the computer is in control to protect operator and equipment failure. A subscription program encoded to the controller computer upgrades the program and ensures the system is being used under a licensed technology agreement with upgrades. Any size configuration or equipment application tractors, lawn care, harvesters, stationary motors can be used. Materials used for construction is not limited to aluminum, although it is preferred. Also there is no limitation with regard to the size of the tubes and the arrangement of gas flows could be reversed either by being center fed, end fed, in a single or twin pipe parallel flow or series. Power generators generating power for a building could use the emissions condenser to heat and power the building as all the heat is removed from the exhaust.

Figure 6:
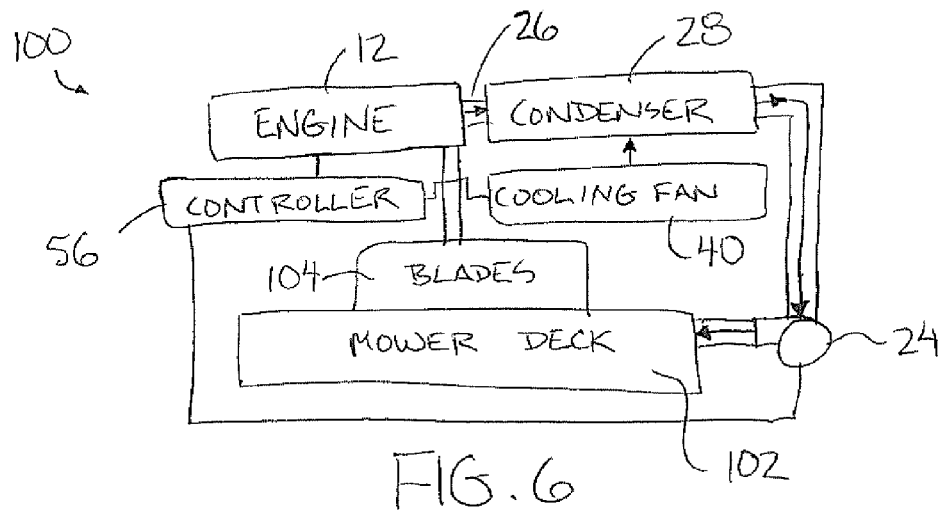
Figure 7:
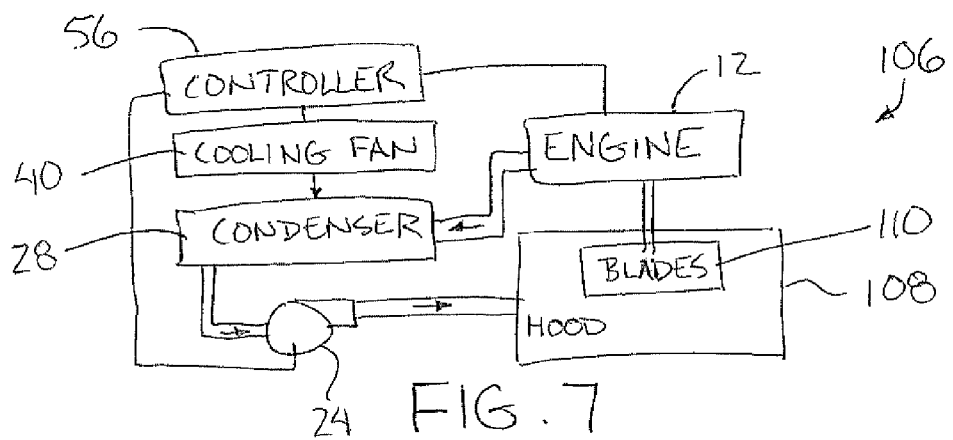

In a further embodiment shown in FIG. 6 the agricultural implement with which the system is used comprises a lawn mower 100 having a mowing deck 102. When the lawn mower is self-propelled, the engine 12 which is used for driving forward movement of the mower across the ground or for rotating the mower blades 104 generates the exhaust emissions which are directed into the exhaust duct 26 for communication through the condenser 28 as described above to communicate between the engine and the mowing deck. An auxiliary impeller fan 24 is mounted in communication with the exhaust duct in this instance to direct the exhaust emissions into the mowing deck. Alternatively, when the lawn mower is towed by a tractor, the engine of the tractor provides the exhaust emissions which are directed by the exhaust duct into the mowing deck. In either embodiment described herein, the impeller fan associated with the agricultural implement is arranged to draw the flow of exhaust emissions through the exhaust duct. The controller 56 operates substantially as described above with regard to previous embodiments to control the engine 12, the implement fan 24 and the cooling fan 40 of the condenser.

In another embodiment, the agricultural implement comprises a roto-tiller 106 having a tiller hood 108. In this instance, the engine 12 is arranged for driving rotation of ground engaging blades 110 of the roto-tiller for driving forward movement of the implement across the ground. Furthermore, the exhaust duct 26 is arranged to communicate exhaust through the condenser 28 between the engine and the tiller hood such that the impeller fan 24 is arranged to direct exhaust emissions into the hood and the exhaust emissions are arranged to be mixed into the ground by the ground engaging blades of the roto-tiller. The controller 56 operates substantially as described above with regard to previous embodiments to control the engine 12, the implement fan 24 and the cooling fan 40 of the condenser.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An exhaust conditioning system in combination with an agricultural implement and an internal combustion engine operatively connected to the agricultural implement for movement therewith across the ground, the system comprising:
    an exhaust duct in communication from the engine to the agricultural equipment so as to be arranged to communicate exhaust emissions from the engine therethrough;
    an impeller fan supported in communication with the exhaust duct so as to be arranged to draw a flow of exhaust emissions from the engine through the exhaust duct;
    a condenser comprising an exhaust passage coupled in series with the exhaust duct so as to be arranged to receive the exhaust emissions therethrough between the engine and the impeller fan;
    a condenser fan supported in proximity to the condenser so as to be arranged to direct cooling air across a surface of the exhaust passage;
    an exhaust temperature sensor arranged to sense a temperature of the exhaust; and
    a computer controller operatively connected to the exhaust temperature sensor and at least one of the condenser fan, the impeller fan or the engine so as to be arranged to controllably vary a rate of at least one of the condenser fan, the impeller fan or revolutions per minute of the engine responsive to the temperature of the exhaust emissions sensed by the exhaust temperature sensor to maintain the temperature of the exhaust emissions within a selected temperature range.

2. The system according to claim 1 wherein the agricultural implement comprises a mower having a mowing deck, and wherein the engine is arranged for driving forward movement of the implement across the ground, the exhaust duct being arranged to communicate between the engine and the mowing deck such that the impeller fan is arranged to direct exhaust emissions into the mowing deck and such that the exhaust emissions are arranged to be mixed with grass clippings of the mowing deck and foliar for feeding the lawn.

3. The system according to claim 1 wherein the agricultural implement comprises a roto-tiller having a tiller hood and wherein the engine is arranged for driving rotation of ground engaging blades of the roto-tiller for driving forward movement of the implement across the ground, the exhaust duct being arranged to communicate between the engine and the tiller hood such that the impeller fan is arranged to direct exhaust emissions into the hood and the exhaust emissions are arranged to be mixed into the ground.

4. The system according to claim 1 wherein the agricultural implement comprises an air seeding implement which comprises a plurality of openers arranged to form furrows in the ground, a seed tank, a plurality of seed tubes arranged to carry seed from the seed tank to the openers, and wherein the engine comprises an engine of a tractor arranged for towing the air seeding implement and the impeller fan comprises a seed fan of the air seeding implement which is arranged to blow the seed through the seed tubes.

5. The system according to claim 4 further comprising a plurality of exhaust temperature sensors, the sensors being located in proximity to respective ones of the openers, the condenser and the engine so as to be arranged to sense a temperature of the exhaust adjacent each of the openers, the condenser and the engine, the computer controller being operatively connected to the plurality of exhaust temperature sensors so as to be arranged to control the impeller fan responsive to the temperature of the exhaust emissions determined by each of the exhaust temperature sensors.

6. The system according to claim 1 wherein the computer controller is operatively connected to the condenser fan so as to be arranged to controllably vary the rate of the condenser fan.

7. The system according to claim 1 wherein the computer controller is operatively connected to the impeller fan so as to be arranged to controllably vary a rate of the impeller fan such that the impeller fan is arranged to lower a pressure in the condenser and raise a pressure of an injection flow.

8. The system according to claim 1 wherein there is provided a relief valve in communication with the exhaust passage and operatively connected to the computer controller so as to be arranged to selectively redirect exhaust emissions from the engine away from the condenser responsive to the impeller fan being inactive.

9. The system according to claim 1 wherein there is provided a relief valve in communication with the exhaust passage and operatively connected to the computer controller so as to be arranged to selectively redirect exhaust emissions from the engine away from the condenser responsive to temperature of the exhaust exceeding a prescribed upper temperature limit.

10. The system according to claim 1 wherein there is provided an auxiliary air intake in communication with the exhaust duct between the engine and the condenser and arranged to inject ambient air into the exhaust duct to be mixed with the exhaust emissions prior to the impeller fan.

11. The system according to claim 10 wherein there is provided an auxiliary fan in communication with the auxiliary air intake so as to be arranged to direct air into the auxiliary air intake, the auxiliary fan being operatively connected to the computer controller so as to be arranged to be controlled by the computer controller.

12. The system according to claim 1 wherein the selected temperature range comprises 90 to 200 degrees Fahrenheit.

13. The system according to claim 1 wherein the condenser comprises:
an exhaust passage coupled in series with the exhaust duct so as to be arranged to receive the exhaust emissions therethrough;
a primary cooling passage in proximity to a first portion of a surface of the exhaust passage so as to be arranged to direct cooling air across the first portion of the surface of the exhaust passage; and
an auxiliary cooling passage in proximity to a second portion of the surface of the exhaust passage so as to be arranged to direct cooling air across the second portion of the surface of the exhaust passage;
wherein the condenser fan is in communication with the primary and auxiliary cooling passages so as to be arranged to blow cooling air through the respective cooling passages; and
wherein the computer controller is operatively connected to the condenser fan so as to be arranged to controllably vary an amount of cooling air received in the primary and auxiliary cooling passages respectively responsive to the temperature of the exhaust emissions sensed by the exhaust temperature sensor.

14. The system according to claim 13 wherein the primary cooling passage extends concentrically through the exhaust passage and wherein the auxiliary cooling passage is directed about an exterior of the exhaust passage.

15. The system according to claim 1 wherein there is provided an emissions analyzer supported in communication with at least one of the exhaust duct or the exhaust passage so as to be arranged to determine contents of the exhaust emissions and wherein the computer controller is operatively connected to the emissions analyzer so as to be arranged to controllably vary the rate of at least one of the condenser fan, the impeller fan or revolutions per minute of the engine responsive to the contents of the exhaust emissions.

16. The system according to claim 1 wherein there is provided an emissions analyzer supported in communication with at least one of the exhaust duct or the exhaust passage so as to be arranged to determine contents of the exhaust emissions and wherein the computer controller is operatively connected to the emissions analyzer and a fuel system of the engine so as to be arranged to controllably vary a rate of bio-fuels having a high protein content consumed by the engine responsive to the contents of the exhaust emissions.

17. The system according to claim 1 wherein there is provided an emissions analyzer supported in communication with at least one of the exhaust duct or the exhaust passage so as to be arranged to determine contents of the exhaust emissions and a fuel additive dispenser supported in communication with the engine so as to be arranged to dispense fuel additives into the engine, and wherein the computer controller is operatively connected to the emissions analyzer and the fuel additive dispenser so as to be arranged to controllably vary a rate of dispensing of the fuel additives responsive to the contents of the exhaust emissions.

18. An exhaust conditioning system in combination with an agricultural implement and an internal combustion engine operatively connected to the agricultural equipment, the system comprising:
an exhaust duct in communication with the engine so as to be arranged to receive exhaust emissions from the engine;
a condenser comprising:
an exhaust passage coupled in series with the exhaust duct so as to be arranged to receive the exhaust emissions therethrough;
a primary cooling passage in proximity to a first portion of a surface of the exhaust passage so as to be arranged to direct cooling air across the first portion of the surface of the exhaust passage;
an auxiliary cooling passage in proximity to a second portion of the surface of the exhaust passage so as to be arranged to direct cooling air across the second portion of the surface of the exhaust passage; and
a condenser fan in communication with the primary and auxiliary cooling passages so as to be arranged to blow the cooling air through the respective cooling passages;
an exhaust temperature sensor arranged to sense a temperature of the exhaust; and
a computer controller operatively connected to the exhaust temperature sensor and the condenser fan so as to be arranged to controllably vary an amount of cooling air received in the primary and auxiliary cooling passages respectively responsive to a temperature of the exhaust emissions sensed by the exhaust temperature sensor to maintain the temperature of the exhaust emissions within a selected temperature range.

19. The system according to claim 18 wherein the primary cooling passage extends concentrically through the exhaust passage and wherein the auxiliary cooling passage is directed about an exterior of the exhaust passage.

20. The system according to claim 19 wherein there is provided a plurality of exchanger tubes supported diametrically across the primary cooling passage in communication between two diametrically opposing sides of the exhaust passage such that each exchanger tube is arranged to communicate exhaust emissions diametrically across the primary cooling passage between the two diametrically opposing sides of the exhaust passage.

* * * * *